Patented May 29, 1928.

1,671,141

UNITED STATES PATENT OFFICE.

FREDERIC LEHNHOFF-WYLD, OF PARIS, FRANCE.

METAL SALTS OF THE N-METHYLENE-SULPHONIC ACIDS OF DIAMINODIHYDROXY-ARSENOBENZENE OR SULPHO-ARSENOL.

No Drawing. Application filed May 28, 1924, Serial No. 716,482, and in France April 17, 1924.

It is known that by placing arsphenamine or neoarsphenamine in presence of a metallic salt of suitable electropolarity, arsenometallic compounds may be obtained which are more active than those of 3,3' diamido, 4,4' dihydroxyarsenobenzene, or of sodium 3,3' diamino, 4,4' dihydroxy - N - methylenesulphinate.

But the bodies thus obtained possess various undesirable qualities, among which are the following: They are essentially unstable, being easily oxidized on exposure to air, or in solution, whereby their toxicity becomes strongly increased. Moreover, when they are used as medicines, they can only be employed as intravenous injections, and not at all subcutaneously, on account of their strong irritating properties.

The present invention affords the means of obtaining complex organo-metallic products containing (the base of) arsphenamine as main ingredient but which are deprived of the undesirable properties referred to above, being far less toxic and suitable for application under the skin.

To accomplish this purpose the invention consists substantially in combining a soluble salt of a heavy metal with the molecule of dihydroxydiamino arsenobenzene before the transformation of this base into sulpho-arsenol (which is the sodium salt of the symmetrical sulphurous ether of methylolamino (3,3'), arseno (1,1') phenol (4,4') more commonly (but wrongly) called 4,4' dihydroxy, 3,3' diamino, arsenobenzene sulphonate of sodium.

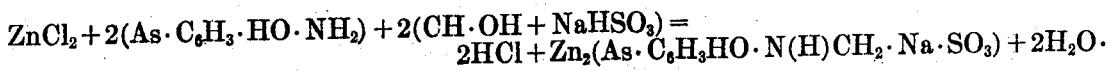

$$ZnCl_2 + 2(As \cdot C_6H_3 \cdot HO \cdot NH_2) + 2(CH \cdot OH + NaHSO_3) = $$
$$2HCl + Zn_2(As \cdot C_6H_3HO \cdot N(H)CH_2 \cdot Na \cdot SO_3) + 2H_2O.$$

According to a first method of carrying out the new process a solution of the organo-metallic product obtained by the reaction of the metallic salt on arsphenamine is treated with crystallized formaldehyde sodium bisulphite or its constituents (formaldehyde and bisulphite of sodium) in aqueous solution, and methyl alcohol is added to cause or to complete the precipitation of the product formed.

A complex organo-metallic derivative of sulpho-arsenol is obtained, possessing the following important advantages:

1. It is neither caustic nor irritating, it is neutral and does not injure living tissues.

2. Its toxicity is very low, being at therapeutic doses from 8 to 15 times lower than that of the original arseno compound.

3. It is little oxidizable in the presence of air or in solution, which does not readily become toxic.

The following example will allow one clearly to understand how the process can be carried into practice.

Example.—For the preparation of zinc-sulfarsenol a molecular weight (44,5 gr.) of arsphenamine is dissolved in 10 parts of methyl alcohol (0.50 litre); on the other hand a molecular weight of bi-chloride of zinc (15 gr.) is diluted in 5 parts (75 grs.) of the same alcohol, and alcoholic hydrochloric acid added, until clear. The two cooled liquids are mixed and there is added one molecular weight (22,5 gr.) (if a product containing one sole lateral chain is desired) or two molecular weights (55 gr.) (if two lateral chains are wanted) of crystallized formaldehyde sodium bisulphite dissolved in 5 parts (250 gr.) of water. The whole is left to settle, and neutralized with N-alcoholic NaOH solution while shaking; the precipitate collected and washed with alcohol. For purification it is dissolved, still moist, in its weight of water; a large excess of acetic acid (concentrated) is slowly poured therein while stirring. After having settled for 12 hours, the liquid is filtered and the precipitate washed with alcohol containing acetic acid in decreasing proportions, at the end with pure alcohol, and is dried under vacuum. The product obtained is a light yellow powder soluble in water in all proportions giving a light yellow solution, insoluble in usual organic mediums. Ammonia and alkaline hydroxides darken the solution without liberating the zinc, which is probably attached directly to the arsenic molecules forming part of the anion; the new salt represents a complex organo-metallic compound of sulpho-arsenol, containing a complex anion of which the metal forms a constitutive part. It is possible to obtain in the same way analogous metallic compounds containing magnesium, cadmium, copper, etc., and even two or more metals at the same time, by using simultaneously or one after the other a certain number of appropriate chlorides or other (in alcohol or water) soluble salts of the heavy metals, not precipitating each other upon intermixture.

The products containing zinc, cadmium, aluminium, magnesium coupled with an arseno-base have never been prepared before, and the use of their chlorides (and of other in alcohol and water soluble salts of said metals) is an essential point of this invention.

I claim—

1. A process for the manufacture of complex metallic salts of sulfarsenol which comprises, first combining a soluble salt of a non-alkaline metal with arsphenamine and treating the resultant product with formaldehyde sodium bisulfite.

2. A process for the manufacture of complex metallic salts of sulfarsenol which comprises treating a solution of the organo metallic product obtained by the treatment of a soluble metallic salt of a non-alkaline metal with arsphenamine dissolved in methyl alcohol with formaldehyde sodium bisulfite.

3. A process for the manufacture of complex metallic salts of sulfarsenol which comprises, combining a soluble chloride of a heavy metal with arsphenamine and treating the product thus obtained with formaldehyde sodium bisulfite.

4. A process for the production of complex metallic salts of sulfarsenol which comprises, treating a soluble heavy metal chloride with arsphenamine dissolved in methyl alcohol and treating the resultant product with formaldehyde sodium bisulfite.

5. A process for the production of complex metallic salts of sulfarsenol which comprises combining a solution of zinc chloride with arsphenamine and treating the resultant product with formaldehyde sodium bisulfite.

6. A process for the production of complex metallic salts of sulfarsenol which comprises a solution of zinc chloride with arsphenamine dissolved in methyl alcohol and treating the resultant product with formaldehyde bisulfite.

7. The metallic combination of sulfarsenol which has the probable formula

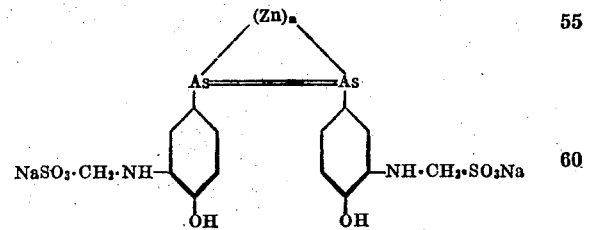

where n equals 1 or 2.

FREDERIC LEHNHOFF-WYLD.